United States Patent [19]

Tamaru

[11] Patent Number: 4,788,637
[45] Date of Patent: Nov. 29, 1988

[54] COMMUNICATION CONTROL APPARATUS

[75] Inventor: Kiichiro Tamaru, Tokyo, Japan

[73] Assignee: Kabushiki Kaisha Toshiba, Kawasaki, Japan

[21] Appl. No.: 912,516

[22] Filed: Sep. 29, 1986

[30] Foreign Application Priority Data

Sep. 30, 1985 [JP] Japan ............................ 60-216840

[51] Int. Cl.[4] .......................... G06F 13/00; H04J 3/24
[52] U.S. Cl. ........................................ 364/200; 370/94
[58] Field of Search ..................... 370/90, 91, 92, 93, 370/94, 95; 364/200 MS File, 900 MS File

[56] References Cited

U.S. PATENT DOCUMENTS

| | | | |
|---|---|---|---|
| 4,060,849 | 11/1977 | Bienvenu et al. | 364/200 |
| 4,309,756 | 1/1982 | Beckler | 364/300 |
| 4,320,520 | 3/1982 | Graham | 370/92 |
| 4,410,889 | 10/1983 | Bryant et al. | 370/94 |
| 4,425,618 | 1/1984 | Bishop et al. | 364/300 |
| 4,430,651 | 2/1984 | Bryant et al. | 370/94 |
| 4,477,898 | 10/1984 | Cholat-Namy | 370/92 |
| 4,484,263 | 11/1984 | Olson et al. | 364/200 |
| 4,558,413 | 12/1985 | Schmidt et al. | 364/300 |
| 4,742,516 | 5/1988 | Yamaguchi | 370/94 |

OTHER PUBLICATIONS

Mano, M. M., *Computer System Architecture*, N.J. Prentice-Hall, 1982, pp. 18-20, 328-338 and 462-473.

Primary Examiner—Gareth D. Shaw
Assistant Examiner—Joseph T. Fitzgerald
Attorney, Agent, or Firm—Foley & Lardner, Schwartz, Jeffery, Schwaab, Mack, Blumenthal & Evans

[57] ABSTRACT

A communication control apparatus wherein the version number of a communication control program in a packet accepted by a receive circuit is compared at a comparator with that of the local station. When the version for the local station is determined to be older than the version for the remote station, the apparatus receives the latest communication control program from the remote station and stores it in a rewritable memory, thereby allowing communication using the latest version.

8 Claims, 5 Drawing Sheets

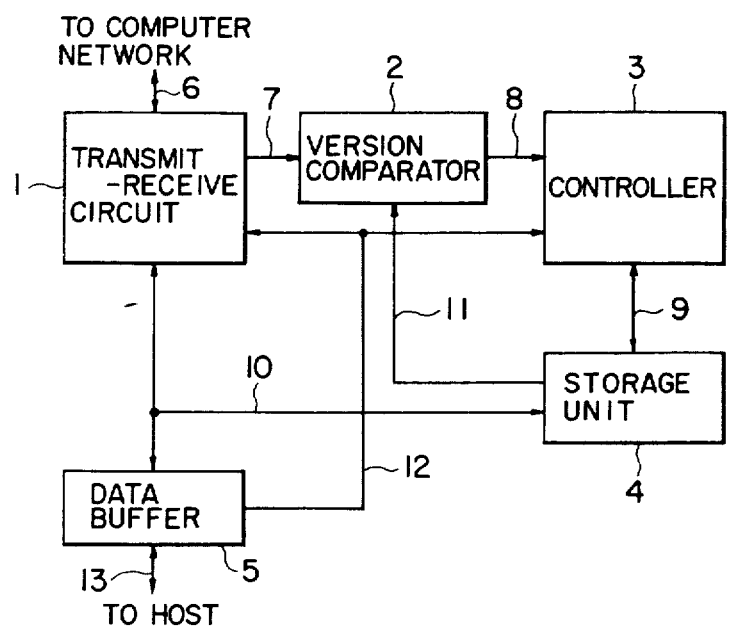
F I G. 1
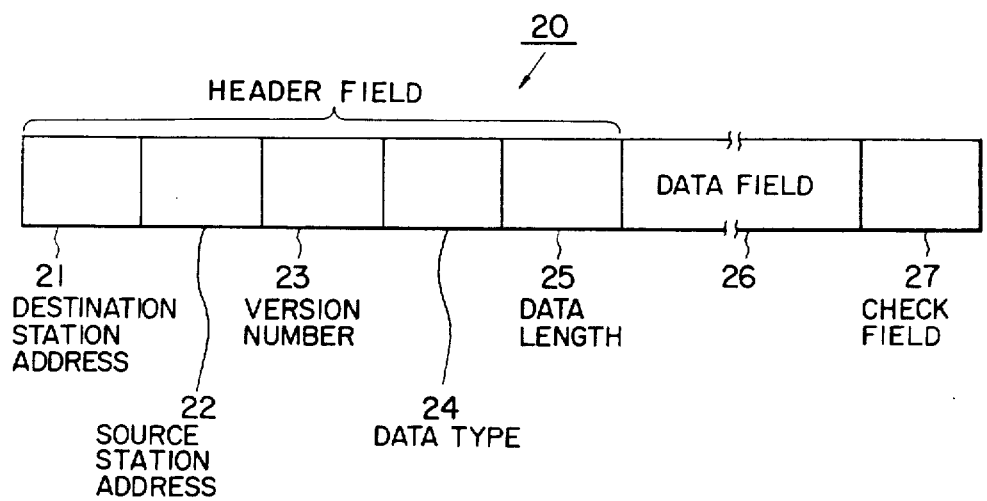
F I G. 2

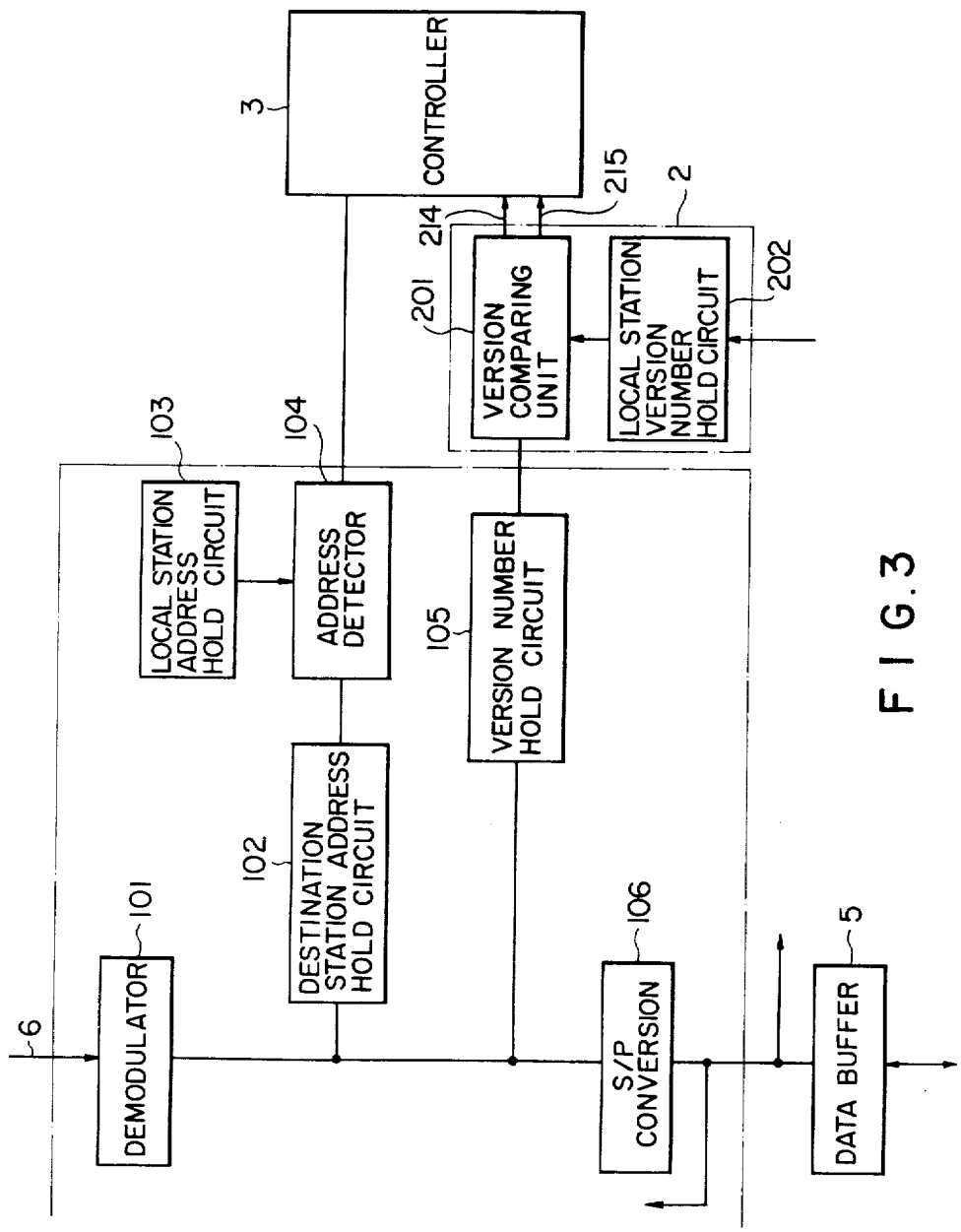
F I G. 3

COMMUNICATION CONTROL APPARATUS

BACKGROUND OF THE INVENTION

The present invention relates to communication control apparatus, especially, used in computer networks.

Computer networks in which computers are connected by communication lines to make mutual exchange of information possible are increasing steadily.

In this computer network, computers are connected via communication control devices to communication lines in order to determine a procedure to perform communication and to accurately control timing for transmission and receiving.

The communication control device is controlled by a communication control program. There are various versions of a communication control program depending upon the performance of the function improvement or debugging.

On the other hand, communication control programs are individually updated for the respective communication control devices constituting the computer network.

Thus when transmission from one station to another is to be performed, there exists a situation where communication may be impossible because of different versions of a program. Especially, when a new station is added to the computer network, a version of a communication control program for the communication control device of the newly added station is not consistent with those for other stations, resulting in the possibility that connection will be difficult.

In order to improve such a situation, a method has been developed in which a function such that communication between different versions of a communication program is enabled is provided by the communication control program itself. There is, however, the problem with this method that the process for executing the communication control program becomes complicated.

Another method is that both the communication control programs for the communication control devices which are intended to communicate therebetween are updated simultaneously. According to this method, however, simultaneous updating of both the programs is required, so that the entire computer network must be stopped at that time, giving rise to the problem that communication efficiency is lowered.

SUMMARY OF THE INVENTION

It is an object of the present invention to provide a communication control apparatus wherein even when versions of a communication control program for source and destination stations are different, connection free from problems can be made.

It is another object of the present invention to provide a communication control apparatus which permits communication between communication control programs of differenct versions without using a complicated communication control function.

It is a further object of the present invention to provide a communication control apparatus which permits good communication even when a new station is added.

In order to attain the above objects, a communication control apparatus according to the present invention includes a transmit-receive circuit connected to a computer network so as to communicate betweent he local station and other remote stations, a rewritable storage unit in which a communication program is stored, a comparison unit for determining whether or not a version number of a communication control program in a packet accepted by the transmit-receive circuit is newer than that of the communication control program stored in the storage unit, and a controller for allowing the local station and a remote station to communicate therebetween using a communication control program of the latest version compatible therebetween on the basis of the output of the comparison unit. This allows smooth communication between stations where different versions of the program are used.

BRIEF DESCRIPTION OF THE DRAWINGS

In the accompanying drawings:

FIG. 1 is a block diagram showing the configuration of an embodiment of a communication control apparatus according to the present invention;

FIG. 2 shows a format of a packet used in the present invention;

FIG. 3 is a block diagram showing the details of a transmit-receive circuit and a version comparator in FIG. 1;

DETAILED DESCRIPTION OF THE PREFERRED EMBODIMENT

Figure 4:
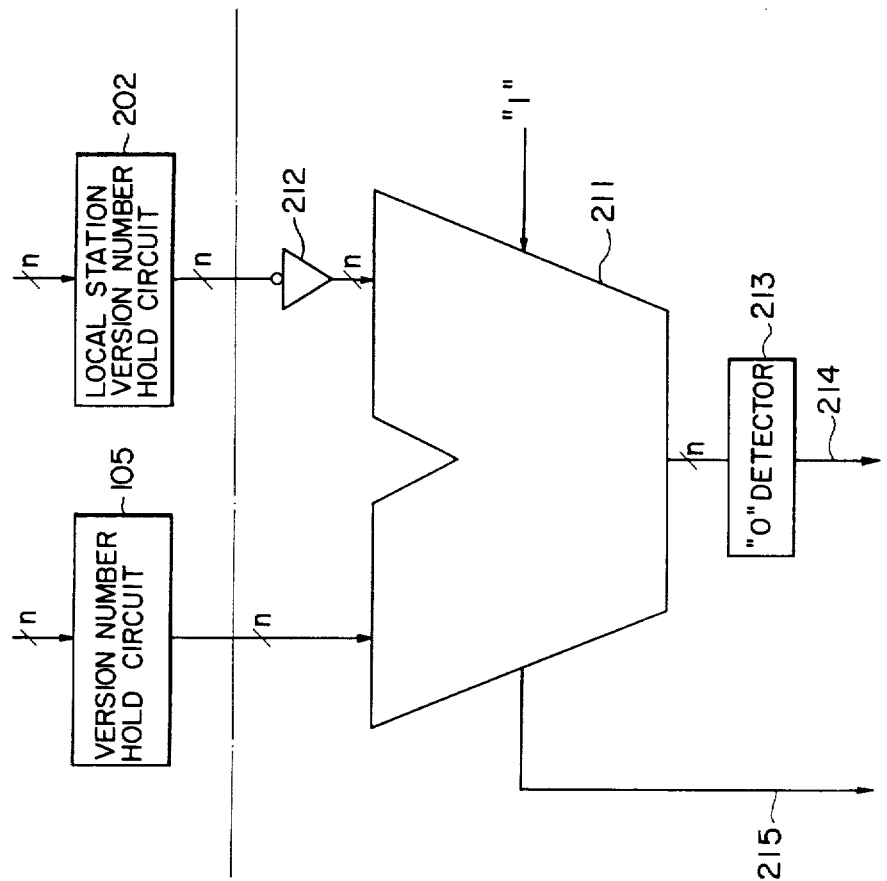
FIG. 4 is a diagrammatical view showing a more detailed configuration of the version comparator.

FIG. 1 is a block diagram showing the configuration of a communication control apparatus according to the present invention. As seen from FIG. 1, a transmitreceive circuit 1 is connected via a transmit-receive signal line 6 to a computer network. The transmitreceive circuit 1 is also connected via an internal data bus 10 to a storage unit 4 comprised of a rewritable memory in which the communication control program is stored, and to a data buffer 5 which is connected via an interface bus 13 to a host computer (not shown). The transmit-receive circuit 1 and the data buffer 5 are controlled via a control signal line 12 by a controller 3. The communication control program is supplied via a control program read bus 9 from the storage unit 4 to the control circuit 3. A version comparator 2 is provided between transmit-receive circuit 1 and controller 3. The version number of a communication control program on the transmit side in a packet received is delivered via a transmission-side version number data line 7 to the version comparator 2. At this version comparator 2, the accepted program version number is compared with the program version number for the local station supplied via a control program version number data line 11 from storage unit 4. It is to be noted that the local station is defined as station localized separately from other remote stations in the area where this communication control apparatus is provided. The result is delivered via a version comparison result signal line 8 to the controller 3 which in turn performs a predetermined control in accordance with the version comparison result, as will be described later in more detail.

FIG. 2 shows an example of a packet which can operate the control apparatus according to the present invention, the packet 20 consists of a header field including information indicating a destination station address 21, a source station address 22, a version number 23, a data type 24 and a data length 25; a data field 26 nest thereto; and a check field 27 including a failure detection code etc. to be finally transmitted. The information indicating the version number 23 in the packet 20 will be read by the transmit-receive circuit 1 and compared at the version comparator 2.

FIG. 3 is a block diagram showing the details of the transmit-receive circuit 1 and the version comparator 2. The packet 20 input via the transmit-receive signal line 6 to the transmit-receive circuit 1 is demodulated by a demodulator 101, and the received or accepted destination station address 21 in the header field is held by a destination station address hold circuit 102. Theoutput from the hold circuit 103 is compared by an address detector 104 with the output from a local station address hold circuit 103 in which the local station address is stored in advance. The result of the comparison is supplied to the controller 3. The version number 23 in the received packet 20 is held by a version number hold circuit 105, the output of which is compared with the local station version number held by a local station version number hold circuit 202 at a version comparing unit 201 in the version comparator 2. The result of the comparison is delivered to the controller 3 via the version comparison result signal line 8. Each of hold circuits 102, 103, 105 and 202 is constituted with a latch, for example. The address detector 104 is only required to detect coincidence or noncoincidence, so that it can be easily implemented by an exclusive OR gate.

FIG. 4 shows an example of the configuration of thee version number comparing unit 201 where the version number is shown as being composed of n bits, for example, 8 bits. The comparing unit 201 is basically comprised of an n-bit full adder 211 which adds the version number of the remote station program held by version number hold circuit 105 and the local station program version number held by the local station version number hold circuit 202 and then inverted by an inverter 212, and outputs the result in the form of an n-bit signal. The carry signal from the least significant or rightmost position is input to the adder while carry of the most significant or leftmost position is output on a line 215. A zero detector 213 detects whether or not the output bits of the full adder 211 are all "0" and outputs the result on a line 214.

In the version comparing unit 201, the full adder output bits become all "0" by the carry when the local station and remote station versions are completely coincident with each other and the output of the zero detector 213 becomes "1". Thus when the signal on a line 214 is "1", the version numbers of the local station and the remote station are equal whereas when the signal on the line 214 is "0", the version numbers are different. Namely, it is determined whether or not the local station program version number is newer than the remote station version number.

In the case where the local station version is different from the remote station version, when the carry output is "0", the local station version is determined to be older than the remote station version. In contrast, when the carry output is "1", the local station version is determined to be newer than the remote station version.

FIGS. 5 to 8 illustrate aspects of communication using the communication control apparatus according to the present invention where it is assumed in these Figures that time passes downward from the top and that data is transferred from the source station (1) to the destination station (2).

Figure 5:
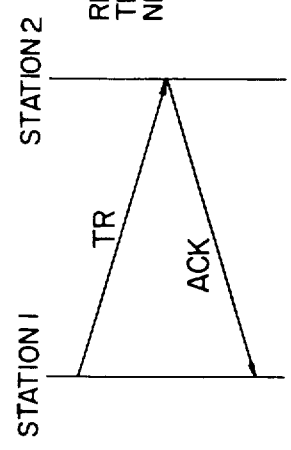
FIGS. 5 to 8 illustrate the operation of the communication control apparatus according to the present invention.

FIG. 5 illustrates a case where there is no difference in version number between the stations (1) and (2). Normal transmission TR is performed from the station (1) to the station (2). When transmission and receiving have been completed, the station (2) sends an acknowledgement signal ACK back to the station (1). The contents of this acknowledgement signal ACK may be stored in advance in the storage unit 4.

Figure 6:
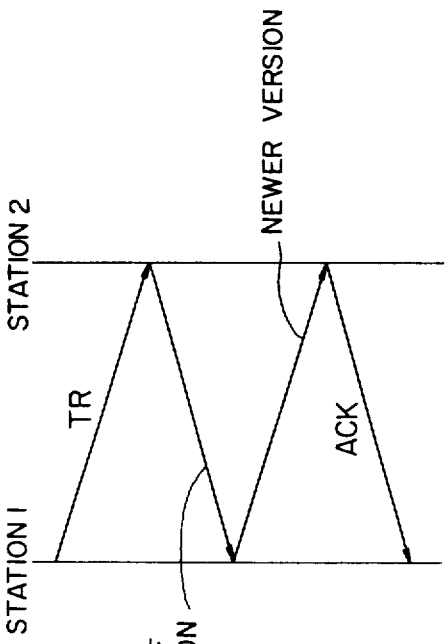

FIG. 6 shows that the program version of the station (1) is newer than that of the station (2).

The transmission packet on the station (1) side is formed so as to include the version number, as shown in FIG. 2, On the station (2) side, the version number in the packet accepted by the transmit-receive circuit 1 and stored once in the data buffer 5 is delivered from the transmit-receive circuit 1 to the version comparator 2. At this comparator 2, the accepted version number is compared with the version number of the communication control program stored in the storage unit 4, so that the version of the station (2) is determined to be older. The controller 3 then sends to the station (1) a message requesting to transfer the newer version of communication control program. Another message sent simultaneously this time may be either to the effect that the transmission has once been accepted or to the effect that the transmission cannot be accepted due to version difference. In response to a request for transfer of the newer version by the station (2), the station (1) reads the newer version of communication control program out of the storage unit 4 and transfers it to the station (2). This causes the contents of storage unit 4 on the station (2) side to be rewritten with the newer version of communication control program. At the same time, an acknowledgement signal ACK is output to the station (1).

Figure 7:
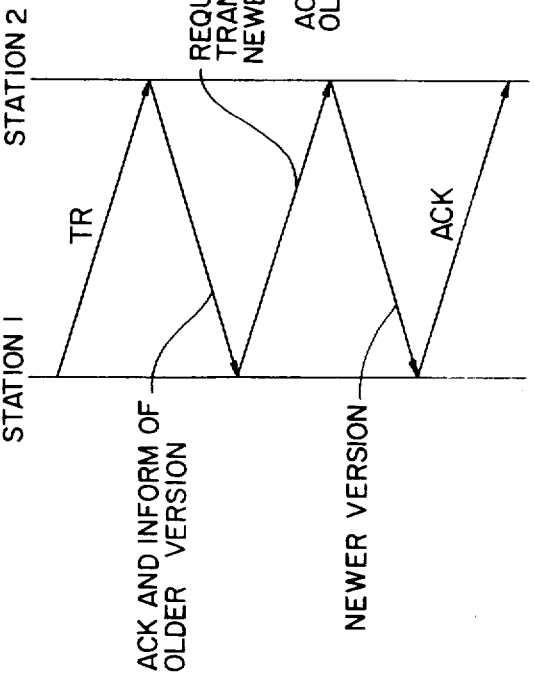
Figure 8:
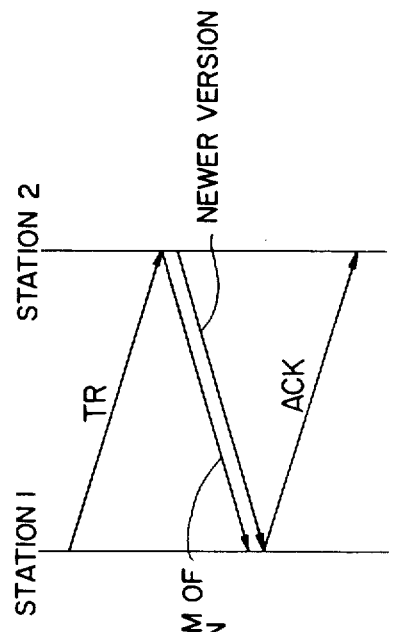

FIGS. 7 and 8 show that on the contrary the station (2) program version is newer than the station (1) version. In FIG. 2, when transmission is performed from the station (1) to the station (2), the station (2) outputs an acknowledgement signal ACK and concurrently informs station (1) that the station (1) version is older. Upon reception of this, the station (1) sends a request for transfer of the newer version and the station (2) transfers the newer version to the station (1). In contrast, in FIG. 8, when the version for the station (1) is determined to be older, the station (2) forcedly transfers to the station (1) the newer version of communication control program.

Figure 9:
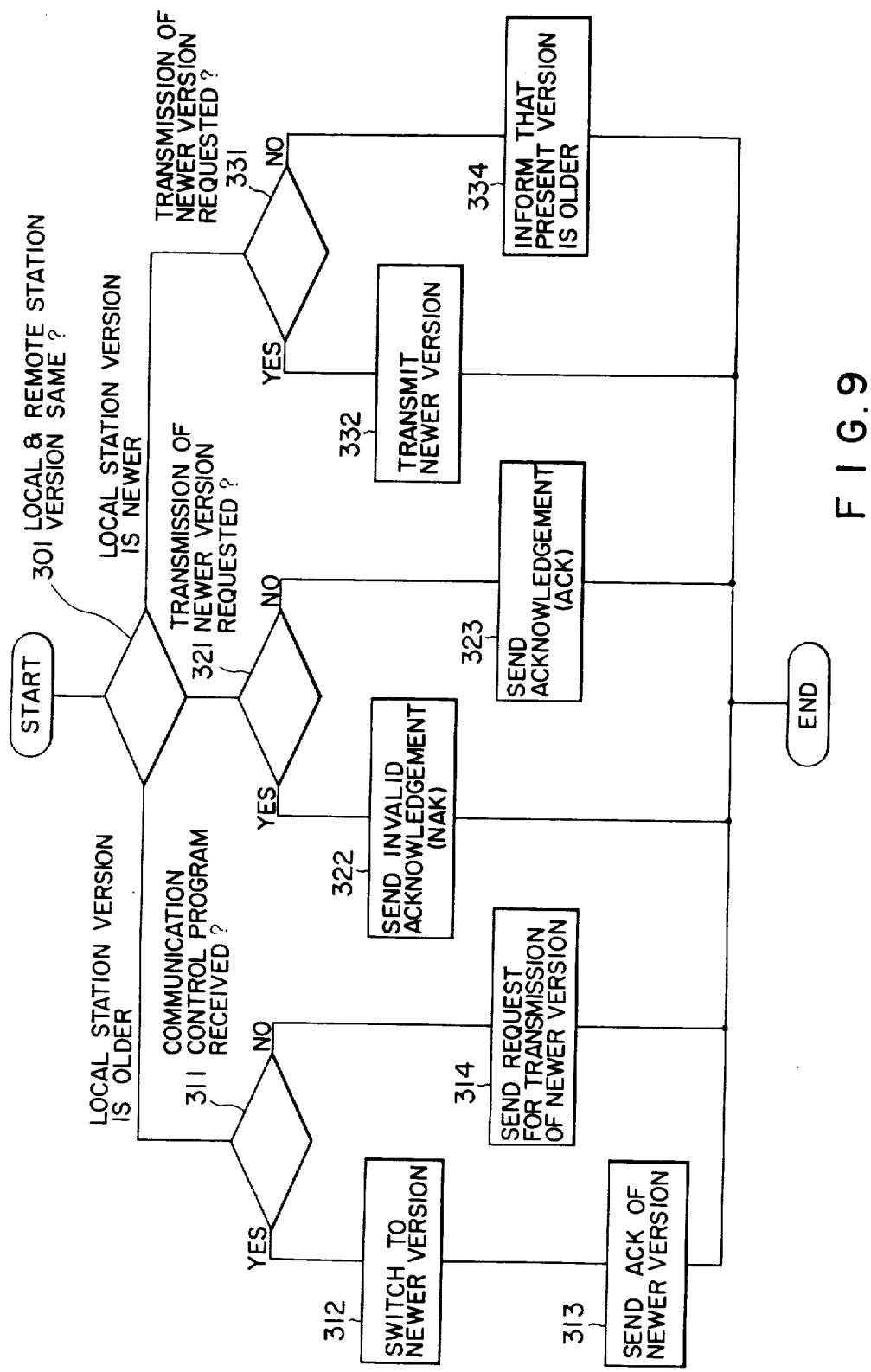
FIG. 9 is a flowchart showing the entire operation of the communication control apparatus according to the present invention.

FIG. 9 is a flowchart showing the operation of controller 3 corresponding to that of the communication control apparatus of FIGS. 5 to 8. First, in the case where the local station program version is determined to be older than the remote station program version on the basis of the result of comparison of the version numbers, when the communication control program is received (step 311), the newer version is selected (step 312) and a newer-version acknowledgement (ACK) signal is sent (step 313). When no communication control program is received, a request for transfer of the newer version is sent (step 314). On the other hand, in the case where the local station side has the newer version, when transmission of the newer version is requested by the remote station (step 331), the newer version is transmitted to the remote station (step 332). Particularly, when no transmission is requested, the remote station is informed that the version is older (step 334). When the versions for the local station and the remote station are the same, the presence of a request for transmission of a newer version is once checked (step 321). When the presence of the request is determined, a negative acknowledgement signal (NAK) is sent (step 322). In contrast, when there is no request for transmission of the newer version, a packet acknowledgement signal (ACK) is sent to the remote station (step 323).

While in the above embodiment the version comparator is provided separately, it is not necessarily required that it is so. What is required is only to include the function of the comparator. For example, the controller can perform such function.

It should be noted that the configuration of the respective blocks of the apparatus should not be limited to those of the embodiment shown. Any elements may be used if they have functions similar to those of the blocks disclosed.

The packet may take another format different from that shown in the embodiment if it includes version information somewhere therein.

As described above, the present invention includes a comparator in which the version number of the communication control program for the local station stored in a storage unit is compared with that for the remote station accepted by the transmit-receive circuit, and a controller which updates the program on the basis of the output from the comparator. Thus updating is possible as needed without stopping the computer network. In addition, no special consideration is required for improving a version of a communication control program, thereby reducing the labor spent for the development of programs.

What is claimed is:

1. A communication control apparatus provided in each computer system for communication between computer systems linked by a computer network comprising:
    a transmit-receive circuit connected to said computer network so as to communicate between a local station and other remote stations;
    a reprogrammable storage unit in which a communication program is stored;
    a comparison unit connected to said transmitreceive circuit for comparing a version number of a communication control program in a packet accepted by said transmit-receive circuit with that of the communication control program stored in said storage unit and outputting comparison results as to which program is of the latest version; and
    a controller connected to said comparison unit, said transmit-receive circuit and said storage unit, for performing communication between said local station and a remote station using a communication control program of the latest version compatible therebetween on the basis of an output of said comparison unit.

2. A communication control apparatus as set forth in claim 1, wherein said transmit-receive circuit includes a version number hold circuit for holding the version number of the communication control program in the packet received so as to transmit the version number to the comparison unit.

3. A communication control apparatus as set forth in claim 2, wherein said version number hold circuit is comprised of a latch.

4. A communication control apparatus as set forth in claim 1, wherein said comparison unit is comprised of an n-bit full adder for adding the version number of a communication control program for the remote station and an inverter for obtaining the inverted number of a communication control program for the local station so as to output a signal representing coincidence/noncoincidence between the version number of the communication control program for the remote station and that of the communication control program for the local station and outputs carry signal representing which version is newer in the case both the version numbers are not coincident with each other.

5. A communication control apparatus as set forth in claim 1, wherein said controller is of a type which requests the remote station to transfer to the local station the newer version of communication control program when the program version for the local station is older than the program version for the remote station, and informs the remote station that the program version for the remote station is older.

6. A communication control apparatus as set forth in claim 1, wherein said controller is of a type which requests the remote station to transfer to the local station the newer version of communication control program when the program version for the local station is older than the program version for the remote station, and forcedly transfers to the remote station the newer version of communication control program, when the program version for the remote station is older than that for the local station.

7. A communication control apparatus as set forth in claim 6, wherein said controller is of a type which sends an acknowledgement signal when it receives a packet.

8. A communication control apparatus as set forth in claim 7, wherein said storage unit is of a type which stores an information message that the communication control program of the local station is of an old version, a request message for transferring communication control program of a newer version and the acknowledgement message for receipt of transferred communication control program.

* * * * *